United States Patent [19]

Gorin et al.

[11] Patent Number: 4,510,221

[45] Date of Patent: Apr. 9, 1985

[54] PROCESS FOR MAKING HIGH EFFICIENCY PHASE HOLOGRAMS

[75] Inventors: Brian A. Gorin, Columbus; Ping-Pei Ho, Cambridge, both of Ohio

[73] Assignee: NCR Corporation, Dayton, Ohio

[21] Appl. No.: 519,442

[22] Filed: Aug. 1, 1983

[51] Int. Cl.[3] .......................... G03H 1/04; G03C 5/44

[52] U.S. Cl. .......................................... 430/1; 430/2; 430/427; 430/428; 430/430; 430/432; 430/434; 430/454; 430/463

[58] Field of Search ........................ 430/1, 2, 427, 428, 430/430, 432, 434, 441, 454, 463

[56] References Cited

U.S. PATENT DOCUMENTS 4,187,106 2/1980 Gladden ................................. 430/1

OTHER PUBLICATIONS

McMahon et al., "Measurements of the Stability of Bleached Photographic Phase Holograms," Applied Optics, Jun. 1970, vol. 9, No. 6, pp. 1363–1368.

Pennington et al., "Techniques for Producing Low-Noise, Improved Efficiency Holograms," Applied Optics, Jul. 1970, vol. 9, No. 7, pp. 1643–1650.

Lamberts et al., "Reversal Bleaching for Low Flare Light in Holograms," Applied Optics, Jun. 1971, vol. 10, No. 6, pp. 1342–1347.

Data Release, Eastman Kodak Co., "Kodak Materials for Holography", 1969.

Glafkides, Photographic Chemistry, vol. 1, pp. 148–149, 1968.

*Primary Examiner*—Mary F. Downey

*Attorney, Agent, or Firm*—J. T. Cavender; Wilbert Hawk, Jr.; Richard W. Lavin

[57] ABSTRACT

A method for producing a phase hologram having a high diffraction efficiency which includes treating a developed photographic material with a stop bath containing sodium sulfate, bleaching with a tanning bleach having a low pH value and fixing the bleached material in a bath containing sodium thiosulfate.

4 Claims, 2 Drawing Figures

PROCESS FOR MAKING HIGH EFFICIENCY PHASE HOLOGRAMS

BACKGROUND OF THE INVENTION

This invention relates to the field of holography and, more specifically, to a process for making phase holograms in photographic material.

Phase holograms prepared by conversion of the metallic silver image of a conventionally processed photographic plate to a transparent compound which has a refractive index which differs from that of the gelatin matrix are known. These holograms are prepared by exposure of a photographic plate to a source of coherent light source under hologram forming conditions. More particularly, a coherent light beam is divided and one portion, the reference beam, is directed to the recording medium or photographic plate and the other to the object to be recorded and the reflection or transmission from the object in the form of a so-called object beam is also directed to the recording medium. The resulting interference pattern of the object beam and reference beam is recorded in the recording medium. The photographic plate when developed by conventional means is termed a hologram and when viewed by transmitted or reflected coherent light of the same wavelength directed to the hologram at the same angularity as the reference beam in the hologram formation has the capacity to duplicate and reproduce the original object beam. The silver halide phase hologram differs only in the sense that in a typical photographic hologram the silver particles forming the grating resulting from exposure are opaque. In the phase hologram the silver metal is converted to a silver salt which, although transparent to light, has an index of refraction that differs from that of the emulsion. The grating principle in the formation of the hologram, however, remains the same.

Phase holograms where bleached photographic plates are employed are those where the metallic silver resulting from exposure and remaining in the emulsion after development is converted to a silver halide, such as bromide. Of course, the silver halide salts produced by bleaching a hologram, while altered by the photographic exposure, development and bleaching process and thereby made less sensitive to light than the original salt of the emulsion, are still subject to photodecomposition, especially when exposed to high intensity laser beams. This photodecomposition or reconversion of the silver halide to silver metal results in print-out darkening of the plate or transparency and with that print-out, limits the life of the phase hologram since the silver metal is opaque and blocks the laser beam rather than transmitting and refracting it as originally intended.

To avoid the print-out darkening characteristics of the bleached silver halide process for making holograms, a process using hardened dichromated gelatin has been used. While this type of process produces a hologram with minimal light scatter or noise and no print-out darkening, the process does not have the light sensitivity and spectral response of the bleached silver halide processes and, in addition, the sensitized dichromated gelatin does not have the storage stability and must be used shortly after preparation for best results. To explain, the hardened dichromated gelatin plates are prepared usually from fixed silver halide emulsion. The plates are sensitized by soaking in an ammonium dichromate solution, dried and then exposed. Following exposure the plates are washed in running water to remove the remaining dichromate sensitizer and dehydrated in Isopropanol baths. The phase holograms formed consist of cross linked or tanned gelatin in a gelatin matrix. The difference in refractive indexes between the tanned and the untanned gelatin produces the diffraction that is the basis for the hologram. The absence of print-out darkening is due to the absence of any light sensitive silver salt in the final product. Thus no desensitizing treatment is required. The disadvantage with the silver halide process is that the silver halide crystals in the photographic plates introduce unwanted scattered light and upon reexposure to light are reduced back to silver which degraded the performance of the hologram. It is therefore the principal object of this invention to provide a process for making phase holograms which combines the operational advantages of both the bleached silver halide hologram and the dichromated gelatin hologram which include longer storage shelf life, greater light sensitivity and wide spectral response of the bleached silver halide hologram as well as low scattering noise, high diffraction efficiency and the lack of print out darkening effects of the dichromated gelatin hologram. Another object of this invention is to provide a process for making a phase hologram from a silver halide emulsion which will contain no metallic silver or silver salts or other metal salts or dyes at the end of the process. A further object of this invention is to provide a process for making phase holograms from a silver halide emulsion which will require no desensitizing treatment to prevent print-out darkening of the finished hologram. A further object of this invention is to provide a process for making a phase hologram from a silver halide emulsion in which the metallic silver in exposed areas is converted by the tanning bleach which also acts to harden the gelatin in those exposed areas and in which the silver halide is removed by non-tanning fixing agents.

SUMMARY OF THE INVENTION

These and other objects of the invention are fulfilled by a process for the production of a phase hologram comprising the steps of:

exposing a silver halide photographic material in the exposure plane of a holographic optical system;

developing the exposed photographic material with agitation using a non-tanning developer;

rinsing the developed photographic material in a sodium sulfate bath containing acetic acid;

rinsing the photographic material in deionized water;

bleaching the developed photographic material with a tanning bleach which converts the metallic silver of the metallic silver image areas of the photographic material while tanning the gelatin in the metallic silver image areas;

rinsing in deionized water;

soaking the photographic material in dilute sodium thiosulfate bath with agitation which removes the silver halide;

washing the photographic material in running deionized water; and dehydrating the photographic emulsion and dry the photographic material in air.

DESCRIPTION OF THE PREFERRED EMBODIMENT

Figure 1:
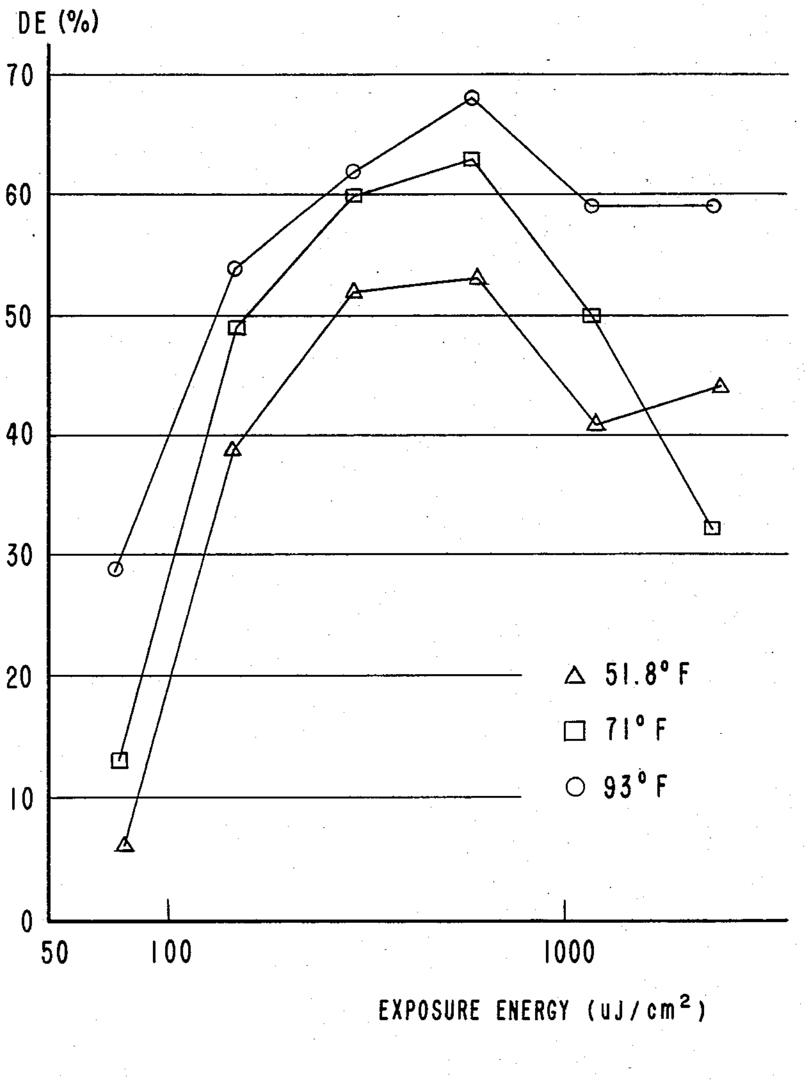
FIG. 1 is a graph showing percent diffraction efficiency as a function of exposure for the hologram produced by the process of this invention, using Kodak 649F photographic plates at various water bath temperatures.

In the process according to this invention, a high resolution, panchromatic, silver halide material in the form of a film or plate, such as Kodak 649F plate, is located in the exposure plane of a holographic optical system. The material is then exposed. Exposures on the order of a few tenths (0.2 to 0.3) milliJoules/square centimeter (mJ/cm$^2$) may be used at any wavelength in the visible light spectrum. Following exposure the material is developed in a non-tanning developer, such as Kodak D-19 developer, which is a high contrast developer that is known not to promote gelatin tanning to any great extent. The developer chemically reduces exposed grains with a minute silver latent image to a relatively compact silver aggregate. The developed material is then treated in a stop bath with a swelling reduction agent such as a sodium sulfate. The primary function of the stop bath is to cease the chemical reduction of silver halide grains by the developer bath via a pH change which prevents normal activity of the developing agents. Essential to the transformation of the absorption image to a phase image involves the blocking of reaction sites in the gelatin molecular network such that they do not interact with water molecules to produce extensive gelatin structure expansion, otherwise referred to as emulsion swelling. Water molecules are incorporated at several locations along the gelatin molecules via a hydrogen bonding mechanism. Subsequent molecular bonding will cause a layered sheet network between adjacent gelatin molecules and hence substantially increase the intermolecular distance between them. The excessively swelled gelatin network will cause a significant lowering of intermolecular cross linking related to the volume structure and an increase in intramolecular cross links which do not enhance imagewise index modulation. The stop bath includes sodium sulfate which reduces the degree of emulsion swelling while enhancing the gelatin imagewise cross linking in the subsequent bleaching step. This is accomplished by reducing the intermolecular distance between the gelatin molecules enhancing the number of intermolecular imagewise cross links.

After rinsing with deionized water the developed material is bleached in a modified Kodak R-10 solution with agitation. The bleach, such as the modified Kodak R-10 is a dichromate bleach which contains a small quantity of halogenative agents which furnishes the desired composition for the chemical transformation of the silver absorption image to the gelatin cross linked volume phase structure. The essential feature of the absorption to phase image transformation is the sensitive balance of the chemical composition which functions in two concurrent reactions. The primary goal of most photochemical bleaches is to convert silver aggregates to silver halides via chemical oxidation of silver atoms to silver ions by the recombination of silver cations (plus) with halide ions (negative). The second purpose of the dichromate bleach is to create a constituent which upon oxidizing the silver image grain, subsequently serves to cross link gelatin molecules in the immediate vicinity of the silver image. The dual activity of the oxidizing agent of the bleach bath involves a pH related contradiction. The gelatin molecular network consists of an ionizable polymer chain of amino acids which possesses a net charge of 0 at the isometric point pH. In an analogous manner for which water is ionically neutral at pH 7, lime processed gelatin demonstrates an ionic balance of (+) and (−) charges at pH 4. As the pH environment changes to less than pH 4, the gelatin molecules possess a higher concentration of localized positive charges along the chain. The increased number of localized positively charged amino acid groups reduces the number of sites for potential gelatin intermolecular cross linking with imagewise created chromium cation (+3). Briefly the dichromate bleach reaction is summarized by the stochiometric equation, $$Cr_2O_7^{+2} + 14H^+ + 6e^- = 2Cr^{+3} + 7H_2O \quad (1)$$

$$6Ag^0 = 6Ag^+ + 6e^- \quad (2)$$

$$6Ag^+ + 6Br^- = 6AgBr \quad (3)$$

The chromium (+6) cation is reduced to chromium (+3) during the oxidation of silver atoms to silver ions and subsequently to silver halide. The chromium (+3) cation creates a coordinated complex which covalently bonds adjacent gelatin molecules. These intermolecular cross links increase the localized mass density of the gelatin network and hence result in the formation of phase image which modulates the index of refraction. Image locations with higher mass density will possess higher indexes of refraction. In this way the silver absorption volumetric grating is transformed into a phase grating of modulated index of refraction which ideally will absorb little, if any, optical flux. A range of pH values from 2.2 to 2.7 of the bleach bath have been found to provide optimum intermolecular cross links and oxidation of the silver atoms for commercially available holographic silver halide emulsions.

TABLE I

Process Steps for use with Kokak 649F Holographic Plates

| Step | | Time | pH | Ambient Light Conditions |
|---|---|---|---|---|
| | Latent Silver Halide Absorption Image Amplification | | | |
| 1 | Develop, Kodak D-19 | 5′ | 10.4 | Dark |
| 2 | Stop bath | 4′ | 2.88 | Dark |
| 3 | Rinse, deionized water | 1′ | 7.0 | Dark |
| 4 | Bleach, modified Kodak R-10 with agitation | 10′ | 2.3 | Dark |
| 5 | Rinse, deionized water | 1′ | 7.0 | Red Light |
| 6 | Soak, dilute sodium thiosulfate bath with agitation | 2′ | 7.0 | Red Light |
| 7 | Wash, running deionized water | 5′ | 7.0 | Red Light |
| 8 | Dehydrate, 50/50 solution of water and isopropyl alcohol with agitation | 5′ | 7.5 | Room Light |
| 9 | Dehydrate, 100% isopropyl alcohol with agitation | 5′ | 8.0 | Room Light |
| 10 | Dry in air | 30′ | | |

TABLE I-continued

| Process Steps for use with Kokak 649F Holographic Plates | | | | |
|---|---|---|---|---|
| Step | | Time | pH | Ambient Light Conditions |
| 11 | Vacuum/bake at predetermined condition | | | |

After bleaching, the photographic material is first rinsed in deionized water to remove the byproducts of the bleaching step from the gelatin emulsion and then soaked in a bath of dilute sodium thiosulfate with agitation. The purpose of this step is to create a chemical complex between the existing silver halide grains in the image and non-image locations such that a residual "latent" phase image is not degraded. Normal "fixing" baths have been shown to yield undesirable results due to subsequent latent phase image degradation. Hence, common chemical components such as potassium alum, sodium sulfite, acetic acid and boric acid have been deleted to permit adequate swelling in the subsequent steps and minimum latent phase image degradation. After soaking in the sodium thiosulfate bath, the photographic material is then washed in running deionized water which serves two essential functions. The first is to remove chemical byproducts of the sodium thiosulfate bath while the second concerns the non-image regions of the emulsion gelatin network. This second function involves the swelling of the gelatin structure such that weakly bonded gelatin molecules in the non-image areas are dispersed while the highly stable covalent cross links created by CR(+3) in the bleaching step remain intact. In this way only image-related cross linked gelatin molecules exist in the volume of the emulsion layer. The extent of the emulsion swelling due to adsorption of the water molecules, is strongly dependent upon temperature, dissolved solid content, and ionic constituents. Deionized water of pH 7 and minimum conductivity demonstrates the greatest degree of swelling. Too much swelling could also be undesirable due to the rupturing of the imagewise gelatin cross links and the overall breakdown of the amorphous gelatin network.

After washing in running deionized water, the photographic material is first rinsed in a 50/50 solution of water and isopropyl alcohol with agitation followed by 100% isopropyl alcohol solution with agitation for dehydrating the water molecules in the photographic material. Removal of water molecules after breakdown of non-image related gelatin intermolecular cross links will permit imagewise intermolecular cross links to form in the localized regions of the $Cr^{+3}$ covalent, coordinated complex chemical bonds. In this way, an ordered gelatin structure is created in the volume of the emulsion layer, which consists of an increased mass density of cross linked gelatin molecules in the image locations of the holographic grating. The spatially modulated mass density in turn represents the required index of refraction modulation which of course is the functional mechanism for volume phase holograms. The rate at which water molecules are removed from the gelatin network determines the effectiveness of subsequent imagewise cross linking. As the water molecules are "captured" by the isopropyl molecules via hydrogen bonding, and diffused from the emulsion layer, the gelatin molecules will migrate closely together in the vicinity of the chromium$^{+3}$ covalent bonds such that intermolecular hydrogen bonding becomes feasible and stable. Therefore the mass density modulation between image and non-image areas is enhanced and the index modulation amplified. In this way, diffraction efficiency of the resultant volume hologram is amplified by a factor greater than 2. Since the primary mechanism for modulation amplification is imagewise hydrogen bonding, the hologram efficiency is sensitive to heat and moisture. As the relative humidity is increased to 80% R. H. under identical temperature and pressure conditions, the moisture content will double and subsequent imagewise hydrogen bond breaking will occur. Likewise, if a hologram is subsequently immersed in a water bath, the hydrogen bonded intermolecular cross links are broken and the diffraction efficiency is reduced by a factor greater than 2. The 100% isopropyl solution decreases the moisture content roughly 50% once the alcohol-water complex is allowed to evaporate from the emulsion layer. After the photographic material has been dehydrated, it is dried in air for one-half hour then vacuum/baked. This step allows the reduction in moisture content to occur without the degradation of the already existent imagewise hydrogen cross links by lowering the atmospheric pressure significantly, raising the temperature, and lowering the relative humidity by a proportionately smaller amount. It has been found that satisfactory results can occur when the vacuum-/oven baking occurs at a temperature of between 40–60 degrees centigrade, with the pressure at 1.0–2.0 mm Hg, which is a medium vacuum; and 20–30% R.H. for a duration of 1–3 hours. This step removes moisture from the emulsion and allows additional hydrogen bonded imagewise cross links to be formed which further amplifies the diffraction efficiency. This step also reduces the "dry" emulsion thickness and increases the gelatin structure melting point. The reduction of the "dry" emulsion thickness is important for the compensation of the Bragg angle shift which occurs due to change in emulsion thickness before exposure and after the plates are processed and dried. Evaporation of residual moisture will reduce the overall thickness, as well as increase the rigidity of the gelatin network and hence also raise the melting point of the processed hologram.

TABLE II

| STEP PREPARATION OF PROCESSING CHEMICAL SOLUTIONS | | | | |
|---|---|---|---|---|
| (0) Continental Water (CW): An ultra-pure deionized water from Continental Water System Corporation of El Paso, Texas. The dissolved ion impurities are less than 0.05 ppm. | | | | |
| (1) Developer D-19: | Elon | $C_6H_4(OH)(HNCH_3)$ | 2 | g/l |
| | Hydro-quinone | $C_6H_4(OH)_2$ | 8 | g/l |
| | Sodium Carbonate | $Na_2CO_3$ | 50 | g/l |
| | Sodium Sulfite | $Na_2SO_3$ | 90 | g/l |
| | Potassium Bromide | KBr | 5 | g/l |
| | Diluted with CW | 1:1 Before Use | | |
| (2) Stop Bath: | CW | $H_2O$ | 1000 | ml |
| | 28% Acetic Acid | $CH_3COOH$ | 32 | ml/l |
| | Sodium Sulfate | | | |
| | $10H_2O$ | $Na_2SO_4$, $10H_2O$ | 100 | g/l |
| (4) Bleach Bath: Stock Solution A | CW | $H_2O$ | 500 | ml |
| | Ammonium Di-chromate | $(NH_4)_2Cr_2O_7$ | 20 | gm |
| | | $H_2SO_4$ | 2 | ml |

TABLE II-continued

| STEP PREPARATION OF PROCESSING CHEMICAL SOLUTIONS | | | |
|---|---|---|---|
| | 98% Sulfuric Acid | | |
| | CW | $H_2O$ To Make | 1 liter |
| Stock Solution B | Potassium Bromide | KBr | 92 g/l |
| | CW | $H_2O$ | 1 liter |
| Before use, mix one part A with ten parts of CW and then mix 1/10 part B with the diluted A solution. | | | |
| (6) Fixing Bath: | Sodium Thiosulfate | $Na_2S_2O_3$ | 75 g/l |
| | CW | $H_2O$ | 1 liter |

TABLE III

EXAMPLES OF RESULTS OF PROCESS WITH COMMERCIALLY AVAILABLE HOLOGRAPHIC PLATES

| Maximum DE Achieved | Emulsion Type | Exposure Energy (uJ/cm$^2$) ± 20% |
|---|---|---|
| 70% | Kodak 649F | 500 |
| 55% | Kodak 120 | 100 |
| 82% | Agfa 8F75 | 50 |

A series of four by five inch Kodak 649F plates were exposed in a holographic optical system to two overlapping beams of coherent, expanded, collimated light. The exposure conditions included the variations in exposure time, the ratio in intensities in the two overlapping beams, and spatial frequencies. The plates were then treated according to the process set forth previously and as set forth in Table I which includes the times and temperatures for each step. The composition of the processing chemistries are set forth in Table II while Table III shows the results of the process on commercially available holographic plates.

Figure 2:
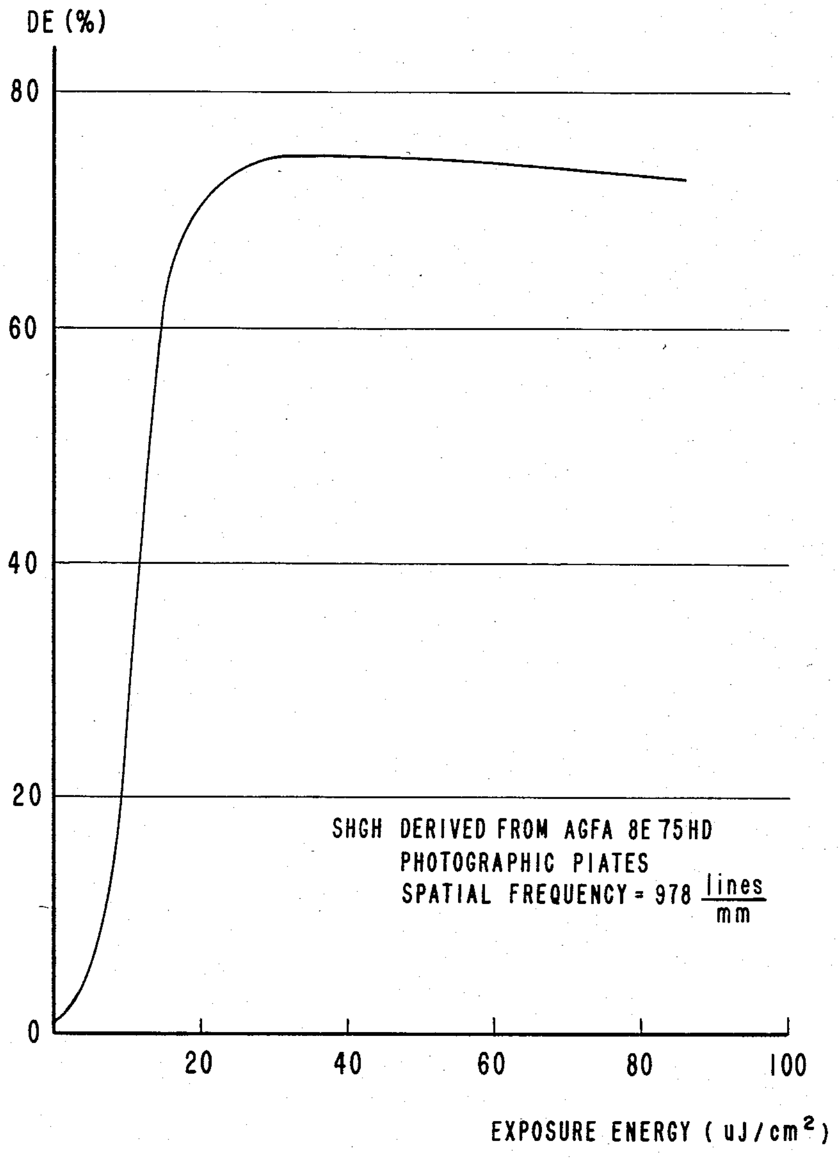
FIG. 2 is a graph showing percent diffraction efficiency as a function of exposure for the hologram produced by the process of this invention using Agfa 8E75HD photographic plates.

The resulting percent diffraction efficiency is shown in a graph of FIG. 1 as a function of exposure and bath temperature using Kodak 649F photographic plates. A He Ne laser with total intensity near 1450 uW/cm$^2$ in the recording plane at a wavelength of 632.8 nm was used to expose the plane wave grating. The interbeam ratio of light intensity (K ratio) was 1.06 and a spatial frequency of 1000 c/mm was used. Fifty plane wave gratings at the respective exposures were prepared on five Kodak 649F plates. A peak diffraction efficiency of 70% is seen near the exposure of 500 uJ/cm$^2$. As shown in FIG. 2, using Agfa 8E, a diffraction efficiency of 77% is seen near the exposure of 30 uJ/cm$_2$. Both curves illustrate the measured diffracted throughput of the incident light and does not delete the effects of reflection, absorption and scattering losses.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention and the limits of the claims.

What is claimed is:

1. A process for the production of a phase hologram comprising the steps of:

exposing silver halide photographic material in the exposure plane of a holographic optical system;

developing the exposed photographic material with a non-tanning developer;

treating the developed photographic material with a stopping agent consisting of a solution of 5–10% by weight of sodium sulfate ($Na_2SO_4$) and 2–3% by weight of acetic acid ($CH_3COOH$) having a pH value of from 2.8 to 3.2;

rinsing the developed photographic material with deionized water having a pH value of 7;

bleaching the developed photographic material with a tanning bleach solution having a range of pH values of from 2.2 to 2.7 and which includes 0.2% by weight of ammonium dichromate ($(NH_4)_2Cr_2O_7$) and 0.01–0.1% by weight of Potassium Bromide (KBr) which removes the silver of the metallic silver image areas while tanning the gelatin in the metallic silver image areas;

rinsing the developed photographic material with deionized water having a pH value of 7;

fixing the bleached photographic material with a non-tanning fixing solution containing 7–15% of weight of sodium thiosulfate ($Na_2S_2O_3$) having a pH value of 7 to remove the silver halide from the photographic material;

washing the bleached and fixed photographic material in a 50/50 solution of water and isopropyl alcohol;

dehydrating the bleached and fixed photographic material in a 100% solution of isopropyl alcohol; and drying the dehydrated material.

2. A process as claimed in claim 1 in which the treatment in the solution contain sodium thiosulfate is for a period of 4 minutes with agitation.

3. A process as claimed in claim 2 in which the bleaching of the photographic material is for a period of 10 minutes with agitation.

4. A process as claimed in claim 3 in which the fixing of the bleached photographic material occurs for a period of 4 minutes with agitation in the fixing solution having a pH value of 7.

* * * * *